United States Patent
Royyuru et al.

(10) Patent No.: US 10,007,900 B2
(45) Date of Patent: Jun. 26, 2018

(54) SYSTEMS AND METHODS FOR FACILITATING POINT OF SALE TRANSACTIONS

(71) Applicant: First Data Corporation, Greenwood Village, CO (US)

(72) Inventors: Vijay Kumar Royyuru, Norristown, PA (US); Peter Allen Donat, Palo Alto, CA (US)

(73) Assignee: First Data Corporation, Greenwood Village, CO (US)

( * ) Notice: Subject to any disclaimer, the term of this patent is extended or adjusted under 35 U.S.C. 154(b) by 159 days.

(21) Appl. No.: 13/650,659

(22) Filed: Oct. 12, 2012

(65) Prior Publication Data

US 2013/0097031 A1   Apr. 18, 2013

Related U.S. Application Data

(60) Provisional application No. 61/546,240, filed on Oct. 12, 2011.

(51) Int. Cl.
*G06Q 20/32* (2012.01)
*G06Q 20/20* (2012.01)

(52) U.S. Cl.
CPC .......... *G06Q 20/20* (2013.01); *G06Q 20/327* (2013.01); *G06Q 20/3276* (2013.01); *G06Q 20/3278* (2013.01)

(58) Field of Classification Search
CPC .. G06Q 20/322; G06Q 20/32; G06Q 20/3276; G06Q 20/3278; G06Q 20/10
See application file for complete search history.

(56) References Cited

U.S. PATENT DOCUMENTS

| | | | |
|---|---|---|---|
| 8,302,847 B2* | 11/2012 | Johnson et al. | 235/375 |
| 2002/0069165 A1* | 6/2002 | O'Neil | 705/40 |
| 2003/0213840 A1* | 11/2003 | Livingston et al. | 235/375 |
| 2004/0167820 A1* | 8/2004 | Melick et al. | 705/16 |
| 2009/0099961 A1* | 4/2009 | Ogilvy | G06Q 20/10 705/39 |
| 2010/0090865 A1* | 4/2010 | Dasgupta | 340/932.2 |
| 2010/0280911 A1* | 11/2010 | Roberts | G06Q 20/202 705/21 |
| 2011/0071914 A1* | 3/2011 | Beasley et al. | 705/21 |
| 2011/0093302 A1* | 4/2011 | Hernandez | 705/5 |
| 2011/0191196 A1* | 8/2011 | Orr et al. | 705/17 |
| 2011/0238474 A1* | 9/2011 | Carr | G06Q 20/10 705/14.23 |
| 2012/0215700 A1* | 8/2012 | Falk et al. | 705/67 |
| 2012/0222055 A1* | 8/2012 | Schaefer et al. | 725/5 |
| 2012/0290438 A1* | 11/2012 | Poniatowski | 705/26.61 |
| 2013/0138518 A1* | 5/2013 | White et al. | 705/16 |

* cited by examiner

*Primary Examiner* — Peter L Ludwig
(74) *Attorney, Agent, or Firm* — Eversheds-Sutherland (US) LLP

(57) ABSTRACT

Systems and methods for facilitating point of sale transactions. In one embodiment, a computer-implemented method can be provided. The method can include collecting, by a mobile device at a merchant point of sale, merchant contextual information associated with a merchant station at a merchant location. The method can also include identifying payment information stored on the mobile device. Further, the method can also include providing the merchant contextual information and the payment information to a merchant device in order to complete a point of sale transaction.

12 Claims, 4 Drawing Sheets

SYSTEMS AND METHODS FOR FACILITATING POINT OF SALE TRANSACTIONS

RELATED APPLICATION

This application claims priority to U.S. Ser. No. 61/546,240, titled "Systems and Methods for Facilitating Point of Sale Transactions," filed on Oct. 12, 2011, the contents of which are incorporated herein by reference.

FIELD OF THE DISCLOSURE

Embodiments of the disclosure relate generally to point of sale transactions, and more specifically to point of sale transactions in which consumer devices are situated remotely to merchant devices that process the transactions.

BACKGROUND OF THE DISCLOSURE

A purchase transaction at a point of sale ("POS") typically involves the provision of payment information from a consumer payment device to a merchant terminal. For example, a consumer payment card is typically swiped by a merchant in order to read magnetic stripe information from the card. Increasingly, a wide variety of other types of consumer devices are being utilized in association with POS payment transactions. For example, a consumer can utilize a contactless smart card or a near field communication ("NFC") mobile device to provide payment information to a merchant terminal.

However, contactless reader devices, such as NFC and radio frequency ("RF") readers, may not be available or deployed at certain merchant points of service. For example, a contactless reader may not be deployed at a gasoline pump or at a particular table within a restaurant. Accordingly, it may take additional time to process a transaction on behalf of a consumer. For example, a consumer may be required to enter a store or other establishment at a gas station in order to pay with a contactless device. As another example, in a restaurant setting, the consumer may be required to wait for a waiter to process a payment device. Additionally, the consumer may be hesitant to provide certain contactless devices, such as mobile phones, to the waiter. Accordingly, there is an opportunity for improved system and methods for facilitating transactions at a merchant point of sale.

BRIEF SUMMARY

Certain embodiments of the disclosure can address some or all of the above needs. Certain embodiments of the disclosure can provide systems and methods for facilitating point of sale transactions. In one embodiment, one or more computer-readable media can be provided. The one or more computer-readable media can be configured to store computer-executable instructions to be executed by one or more processors. The computer-executable instructions can configure the one or more processors to collect, by a mobile device at a merchant point of sale, merchant contextual information associated with a merchant station at a merchant location. In addition, the computer-executable instructions can configure the one or more processors to identify payment information stored on the mobile device. In addition, the computer-executable instructions can configure the one or more processors to provide the merchant contextual information and the payment information to a merchant device in order to complete a point of sale transaction.

In one aspect of an embodiment, the merchant contextual information can include at least one of (i) a merchant identifier, (ii) a merchant location, or (iii) an identifier of the merchant station.

In one aspect of an embodiment, the merchant station can include one of (i) a gas pump or (ii) a restaurant table location.

In one aspect of an embodiment, the payment information can include a payment account number.

In one aspect of an embodiment, the merchant contextual information can be collected by reading data from one or more contactless tags associated with the merchant station.

In one aspect of an embodiment, the merchant contextual information can be collected by scanning at least one of (i) a barcode image or (ii) a quick response code image associated with the merchant station.

In one aspect of an embodiment, the computer-executable instructions can further configure the one or more processors to determine global positioning coordinates associated with the mobile device; and identify at least a portion of the merchant contextual information based at least in part upon the global positioning coordinates.

In one aspect of an embodiment, the computer-executable instructions can further configure the one or more processors to establish communication with a merchant location network; and identify at least a portion of the merchant contextual information via the established communication.

In another embodiment, a merchant device can be provided. The merchant device can include at least one communications interface configured to receive merchant contextual information and payment information from a mobile device located at a merchant station associated with a merchant location. The merchant device can also include at least one processor configured to (i) process the merchant contextual information to identify the merchant station, (iii) process a payment transaction utilizing the payment information.

In one aspect of an embodiment, the merchant contextual information can include at least one of (i) a merchant identifier, (ii) a merchant location, or (iii) an identifier of the merchant station.

In one aspect of an embodiment, the merchant station can include one of (i) a gas pump or (ii) a restaurant table location.

In yet another embodiment, a computer-implemented method can be provided. The method can include collecting, by a mobile device at a merchant point of sale, merchant contextual information associated with a merchant station at a merchant location. The method can also include identifying payment information stored on the mobile device. Further, the method can also include providing the merchant contextual information and the payment information to a merchant device in order to complete a point of sale transaction.

In one aspect of an embodiment, the merchant contextual information comprises at least one of (i) a merchant identifier, (ii) a merchant location, or (iii) an identifier of the merchant station.

In one aspect of an embodiment, the merchant station can include one of (i) a gas pump or (ii) a restaurant table location.

In one aspect of an embodiment, the payment information can include a payment account number.

In one aspect of an embodiment, the merchant contextual information can be collected by reading data from one or more contactless tags associated with the merchant station.

In one aspect of an embodiment, the merchant contextual information can be collected by scanning at least one of (i) a barcode image or (ii) a quick response code image associated with the merchant station.

In one aspect of an embodiment, the method can further include determining global positioning coordinates associated with the mobile device; and identifying at least a portion of the merchant contextual information based at least in part upon the global positioning coordinates.

In one aspect of an embodiment, the method can further include establishing communication with a merchant location network; and identifying at least a portion of the merchant contextual information via the established communication.

DETAILED DESCRIPTION OF THE DISCLOSURE

Figure 1:
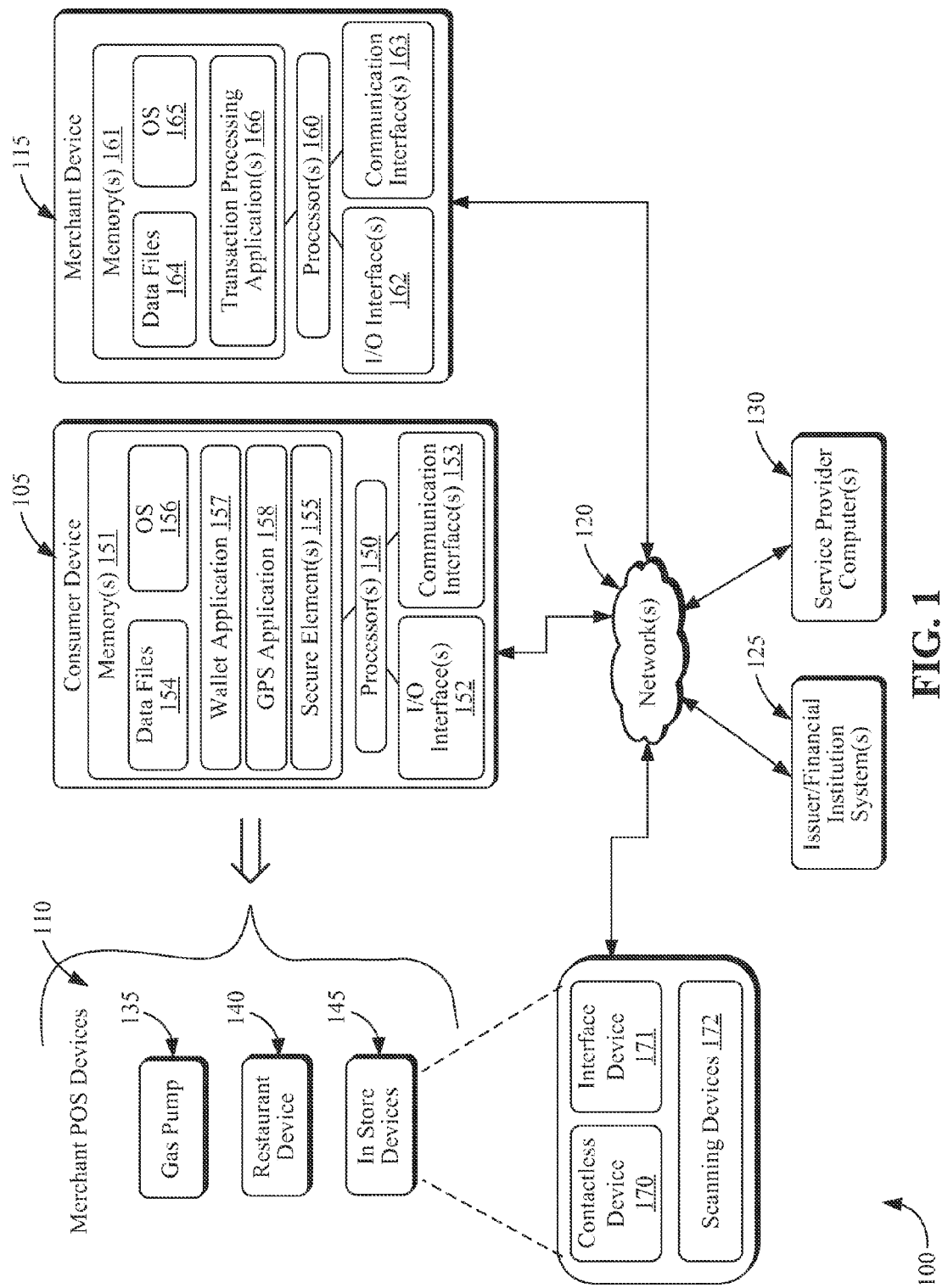
FIG. 1 illustrates a block diagram of an example system that may be utilized in accordance with various embodiments of the disclosure.

Various embodiments of the disclosure are directed to systems and methods for facilitating point of sale transactions. According to an aspect of the disclosure, a consumer device (e.g., a mobile device, etc.) may facilitate the collection of merchant contextual information associated with a payment transaction. For example, the consumer device may facilitate the collection of merchant identification information (e.g., a merchant name, a merchant location, etc.) and/or the collection of information associated with a particular payment station (e.g., a gas pump at a gas station, a table in a restaurant, etc.). Alternatively, an identifier (e.g., a serial number, a location identifier, etc.) may be collected by the consumer device, and the collected identifier may facilitate the identification, access, and/or collection of merchant information (e.g., a merchant name, a merchant station identifier, a merchant location, etc.) by another entity. A wide variety of suitable techniques may be utilized as desired to collect merchant contextual information. For example, a static information device (e.g., an near field communication ("NFC") tag, a radio frequency ("RF") tag) may be read to collect merchant contextual information. As another example, a barcode image or quick response ("QR") code may be scanned. As another example, global positioning system ("GPS") coordinates or a local network communications session (e.g., a Wi-Fi connection, etc.) may be utilized in order to identify a merchant location and payment station identification information may be entered by a consumer.

Once merchant contextual information has been obtained by the consumer device, a communications session may be established between the consumer and a merchant device, such as a merchant transaction processing system. For example, communication may be established between a consumer device and a payment terminal (e.g., a cash register, etc.) at a merchant location. A wide variety of suitable methods and/or networks may be utilized to establish the communication, such as local area networks, cellular networks, and/or other networks. The merchant device may receive the collected merchant contextual information and payment information (e.g., payment account information) from the consumer device, and the merchant device may utilize the information to complete a payment transaction. As an alternative to the merchant device initiating a payment transaction, the consumer device may communicate a proposed transaction to a transaction processor (e.g., an issuer system, a service provider system, etc.) in order to initiate a payment transaction. In either scenario, the consumer device may function as a suitable reader that facilitates the collection of transaction-related information. In this regard, it is not necessary for a merchant POS device to be equipped with specific devices (e.g., NFC readers, RF readers, etc.) that facilitate the reading of payment information from the consumer device.

In certain embodiments, the consumer device may be a consumer device that is configured to facilitate contactless payment transactions, such as near field communication ("NFC") or radio frequency ("RF") transactions. However, the merchant POS device may be a device that is not configured to facilitate contactless transactions. For example, a gas pump may not be configured to facilitate contactless transactions. Accordingly, the consumer device may provide reader functionality configured to collect transaction related information, and the consumer device may communicate with a merchant device or merchant system in order to initiate a transaction.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

System Overview

FIG. 1 represents a block diagram of an example system 100 for facilitating point of sale transactions, according to one embodiment of the disclosure. In certain embodiments, the system 100 may facilitate the collection of merchant contextual information by a consumer device, and the provision of the merchant contextual information to a merchant device or system to facilitate completion of a payment transaction. As shown in FIG. 1, the system 100 may include one or more consumer devices 105, at least one merchant device 115 (e.g., a merchant register, a merchant payment terminal, a merchant computer, etc.), and/or one or more merchant POS devices 105 (e.g., merchant POS terminals, merchant registers, merchant computers, etc.). As desired, one or more suitable networks 120 may facilitate communication between various components of the system 100. Additionally, in certain embodiments, the system 100 may include a wide variety of other entities associated with payment transactions, such as one or more payment account issuer systems and/or computers 125 and/or one or more service provider computers 130.

With reference to FIG. 1, any number of consumer devices 105 may be provided. Examples of suitable consumer devices 105 include, but are not limited to, mobile devices (e.g., mobile phones, smart phones, etc.) and other contactless transaction devices. In operation, a consumer device 105 may facilitate collection of merchant contextual information and the provision of the collected information to a merchant device 115. For example, the consumer device 105 may facilitate the collection of merchant contextual information from a wide variety of different types of merchant POS devices 110, such as a gas pump 135, a restaurant device 140, or various in store (i.e., merchant location) devices 145. In certain embodiments, the consumer device 105 may additionally be equipped with contactless communications functionality, such as NFC, RF, and/or other functionality.

As desired, a consumer device 105 may include any number of processor-driven devices, including but not limited to, a mobile computer, an application-specific circuit, a minicomputer, a microcontroller, and/or any other processor-based device. A consumer device 105 may utilize one or more processors 150 to execute computer-readable instructions that facilitate the general operation of the consumer device 105 (e.g., call functionality, etc.) and/or the collection of merchant contextual information to facilitate payment transactions. As a result of executing these computer-readable instructions, a special purpose computer or particular machine may be formed that facilitates the completion of a payment transaction in which the consumer device 105 acts as a virtual reader to collect transaction-related information.

In addition to having one or more processors 150, the consumer device 105 may further include and/or be associated with one or more memory devices 151, input/output ("I/O") interface(s) 152, and/or communication and/or network interface(s) 153. The memory 151 may be any computer-readable medium, coupled to the processor(s) 150, such as random access memory ("RAM"), read-only memory ("ROM"), and/or removable storage devices. The memory 151 may store a wide variety of data files 154 and/or various program modules, such as an operating system ("OS") 156, one or more wallet applications 157, and/or a global positioning system ("GPS") application. In certain embodiments, a consumer device 105 may include one or more secure elements 155 configured to securely store and/or access information, such as payment applications, payment account information, and/or other transaction-related information. The secure elements 155 may be stored in the memory 151 and/or included as a separate component of the consumer device 105. For example, a secure element 155 may be a separate chip that is configured to communicate with primary computing functionality for the consumer device 105. As desired, one or more of the transaction applications may be stored on a secure element 155. These transaction applications may be invoked by other components of the consumer device 105, such as the wallet application 157.

The data files 154 may include any suitable data that facilitates the operation of the consumer device 105 and/or interaction of the consumer device 105 with one or more other components of the system 100. For example, the data files 154 may include information associated with accessing the secure elements 155, information associated with invoking a wallet application 157, information associated with invoking one or more transaction applications, information that facilitates the collection of merchant contextual information, information that facilitates collection of information associated with items (e.g., products, services, bundles of products and/or services, etc.) to be purchased, and/or information that facilitates the output of information to a recipient system (e.g., the merchant device 115, an issuer system 125, a service provider computer 130) in association with a payment transaction. The OS 156 may be suitable module that facilitates the general operation of the consumer device 105, as well as the execution of other program modules. For example, the OS 156 may be, but is not limited to, a suitable mobile OS or a specially designed operating system. As desired, the consumer device 105 may additionally include one or more communication modules that facilitate interaction with other devices, such as merchant POS devices equipped with contactless readers and/or other communications functionality. For example, a suitable near field communication module, radio frequency module, Bluetooth module, or other suitable communication module may be included in the consumer device 105.

The wallet application 157 may include one or more suitable software modules and/or applications configured to facilitate the collection of merchant contextual information and/or other transaction-related information. Additionally, the wallet application 157 may be configured to facilitate the communication of transaction-related information to a suitable processing system, such as the merchant device 115. Additionally, in certain embodiments, the wallet application 157 may be configured to facilitate the direction of operations associated with one or more contactless payment transactions, such as the output of payment information to be received by a contactless reader device. As desired, the wallet application 157 may invoke any number of suitable transaction applications, such as transaction applications stored on the secure elements 155. The transaction applications may be, for example, applications associated with various payment accounts and/or payment account issuers.

In operation, a consumer may invoke a wallet application 157 at a merchant location. For example, the wallet application 157 may be invoked while the consumer is at a gas pump 135, while the consumer is at a table in a restaurant, or while the consumer is in a store. Once activated, the wallet application 157 may facilitate the collection of merchant contextual information, such as a merchant name, a merchant location, and/or an identifier of a merchant POS device 110 (e.g., a gas pump 135, a restaurant device 140, an in-store device 145, etc.). Alternatively, an identifier (e.g., a serial number, a location identifier, etc.) may be collected by the consumer device, and the collected identifier may facilitate the identification, access, and/or collection of merchant information (e.g., a merchant name, a merchant station identifier, a merchant location, etc.) by another entity, such as the merchant device 115 or a service provider computer 130. A wide variety of suitable methods and/or techniques may be utilized as desired to collect or capture merchant contextual information by the wallet application 157 and/or related applications. A few example techniques are described in greater detail below with reference to FIGS. 3A-3D. For example, the wallet application 157 may direct the consumer device 105 to invoke one or more suitable reader devices (e.g., an NFC chip or reader, an RF chip or reader, a camera, etc.) to collect information from a static device (e.g., a static contactless device 170 such as an NFC tag or RF tag, etc.) or from one or more images (e.g., a barcode image, a QR code, etc.) situated at the merchant POS device 110. As another example, the wallet application 157 may direct the GPS application 158 to determine a position (e.g., GPS coordinates) of the consumer device 105. The wallet application 157 may then utilize the determined position to identify a merchant identifier and location, and the wallet application 157 may then prompt the user to enter identification information associated with the merchant POS device 110 (e.g., a gas pump number, a table number, etc.). As another example, the wallet application 157 may establish a local area network communication with a merchant system (e.g., a Wi-Fi connection) and a merchant location and/or identity may be received via the local area connection. The wallet application 157 may then prompt the user to enter identification information associated with the merchant POS device 110. Indeed, a wide variety of suitable techniques may be utilized to collect merchant contextual information, and the techniques described above are provided by way of example only.

In addition to collecting merchant contextual information, the wallet application 157 may collect and/or identify a wide variety of other transactional-related information. In certain embodiments, the wallet application 157 may facilitate the collection of information associated with one or more items to be purchases. For example, the wallet application 157 may direct one or more suitable reader devices to collect item information from contactless tags (e.g., NFC tags, RF tags, etc.) associated with items to be purchases (e.g., tags on items, tags on shelves, etc.). As another example, the wallet application 157 may direct one or more suitable reader devices to scan one or more barcodes or other images (e.g., QR codes, etc.) associated with items in order to collect item information. Alternatively, the wallet application 157 may facilitate the receipt of item information from any number of merchant checkout devices, such as merchant scanning devices. In this regard, the wallet application 157 may facilitate the collection of item-related information and allow a "checkout in the aisle" option or a checkout option in which the items are not required to be scanned at a merchant register or payment terminal.

The wallet application 157 may additionally facilitate the identification of a wide variety of payment information or payment data to be communicated to the merchant device 115. According to an aspect of the disclosure, the payment information may include information associated with a payment account to be utilized in association with a payment transaction, such as a payment account number. In one example embodiment, the payment information may include track one and track two data, such as the data that may be stored by a conventional magnetic stripe payment device. Additionally, in certain embodiments, the payment information may include a wide variety of other transaction-related information, such as consumer identification information, consumer device identification information, coupons and/or offers to be redeemed, loyalty information (e.g., a loyalty account number, if available), electronic receipt preferences, warranty preferences, product registration preferences, etc.

In certain embodiments, the wallet application 157 may direct the communication of transaction-related information to a merchant device 115 in order to facilitate completion of a payment transaction. For example, any number of suitable networks 120 (e.g., a local area network, the Internet, a cellular or mobile network, etc.) may be utilized to facilitate communication of transaction-related information (e.g., merchant contextual information, payment information, item information, etc.) to a merchant device 115. The merchant device 115 may then facilitate the completion of a payment transaction. Additionally, in certain embodiments, the merchant device 115 may communicate with a service provider computer, an acquiring platform, an issuer system, and/or other devices in order to facilitate the back-end processing of a transaction (e.g., authorization, settlement, value added services, etc.). In other embodiments, the consumer device 105 and/or the wallet application 157 may communicate with one or more of these entities in conjunction with transaction processing. For example, the wallet application 157 may provide payment account information to a service provider computer 130 rather than to the merchant device 115. Indeed, a wide variety of different transaction processing flows and/or methods may be utilized as desired in various embodiments.

A few examples of the operations that may be performed by the wallet application 157 and/or the consumer device 105 are described in greater detail below with reference to FIGS. 2-4.

The one or more I/O interfaces 152 may facilitate communication between the consumer device 105 and one or more input/output devices; for example, one or more user interface devices, such as a display, a keypad, a touch screen display, a microphone, a speaker, etc., that facilitate user interaction with the consumer device 105. The one or more network and/or communication interfaces 153 may facilitate connection of the consumer device 105 to one or more suitable networks, for example, the network(s) 120 illustrated in FIG. 1. In this regard, the consumer device 105 may receive and/or communicate information to other components of the system 100.

With continued reference to FIG. 1, a wide variety of different types of merchant POS devices 110 or merchant station devices may be provided. These merchant POS devices 110 may be devices associated with an actual point of sale and/or point of service at which a consumer seeks to purchase goods and/or services. Additionally, these merchant POS devices 110 may be situated remotely from a merchant device 115 that facilitates completion of a payment transaction. Examples of suitable merchant POS devices 110 include, but are not limited to, a gas pump 135, a restaurant device 140, such as a device situated at a table in a restaurant, and/or a wide variety of in store devices 145, such as devices associated with items to be purchased.

As desired, a merchant POS device 110 may include a wide variety of different components that facilitate collection of merchant contextual information by a consumer device 105. For example, a merchant POS device 110 may include any number of contactless devices 170 (e.g., NFC tags, RF tags, other static contactless devices, etc.) that may be read (e.g., read during a contactless "tap" transaction, etc.) by the consumer device 105 in order to collect merchant contextual information. As another example, a merchant POS device 110 may include one or more images that may be scanned by a consumer device 105 in order to collect merchant contextual information.

Additionally, in certain embodiments, a merchant POS device 110 may include one or more suitable interface devices 171 (e.g., touch screens, key pads, etc.) that facilitate the collection of information from a consumer. For example, as explained in greater detail below with reference to FIG. 3D, a consumer may utilize an interface device 171 to provide a consumer device identifier (e.g., a mobile telephone number, etc.) to a merchant POS device 110. The merchant POS device 110 may then provide the consumer device identifier and merchant contextual information to the merchant device 115, and the merchant device 115 may utilize the consumer device identifier to invoke a wallet application 157 on the consumer device 105 in order to complete a payment transaction. Additionally, as desired in certain embodiments, the merchant POS device 110 may include any number of scanning devices 172, such as barcode readers, that may be utilized by a consumer to collect information associated with items to be purchased (e.g., item identifiers (i.e., Universal Product Codes, serial numbers, etc.), pricing information, etc.), and the scanning devices 172 may provide the item information to a consumer device 105 associated with the consumer.

With continued reference to FIG. 1, any number of merchant devices 115 may be provided. A merchant device 115 may be a suitable device that facilitates the completion of payment transactions. In operation, the merchant device 115 may utilize one or more processors 160 to execute computer-readable instructions that facilitate the collection of transaction-related information (e.g., information associated with items to be purchased, transaction amounts, consumer payment account information, merchant contextual information, value added service ("VAS") information, etc.) and/or the generation and/or output of transaction-related requests (e.g., transaction authorization requests, value added service ("VAS") requests, etc.). As a result of executing these computer-readable instructions, a special purpose computer or particular machine may be formed that facilitates the completion of payment transactions.

In addition to having one or more processors 160, the merchant device 115 may further include and/or be associated with one or more memory devices 161, input/output ("I/O") interface(s) 162, and/or network interface(s) 163. The memory 161 may be any computer-readable medium, coupled to the processor(s) 160, such as random access memory ("RAM"), read-only memory ("ROM"), and/or removable storage devices. The memory 161 may store a wide variety of data files 164 and/or various program modules, such as an operating system ("OS") 165 and/or one or more transaction processing applications or modules 166. The data files 164 may include any suitable data that facilitates the operation of the merchant device 115 and/or interaction of the merchant device 115 with one or more other components (e.g., a consumer device 105, a merchant POS device 110, one or more issuer systems 125, one or more service provider computers 130, etc.) of the system 100. For example, the data files 164 may include information that facilitates the establishment of a communications session with a consumer device 105, acquiring platform information, service provider information, information associated with the generation of proposed transaction and/or VAS requests, information associated with available VAS, and/or routing information for proposed transactions.

The OS 165 may be suitable module that facilitates the general operation of the merchant device 115, as well as the execution of other program modules. For example, the OS 165 may be, but is not limited to, Microsoft Windows®, Apple OSX™, Unix, a mainframe computer operating system (e.g., IBM z/OS, MVS, OS/390, etc.), or a specially designed operating system. The transaction processing applications or modules 166 may include any number of suitable software modules and/or applications that facilitate the receipt of transaction-related information (e.g., merchant contextual information, purchase transaction information, a purchase amount, information associated with purchased products, etc.), the generation of a proposed transaction, and/or the output of the proposed transaction. In certain embodiments, the transaction processing applications 166 may additionally facilitate the identification of information associated with a wide variety of value added services and the generation of one or more requests to invoke value added services, such as requests communicated to one or more service provider computers 130.

According to an aspect of the disclosure, the transaction processing application 166 may be configured to receive transaction-related information from a consumer device 105. For example, the transaction processing application 166 may be configured to receive merchant contextual information and payment information from a consumer 105 via any number of suitable networks and/or communication techniques. As desired, the transaction processing application 166 may receive certain information (e.g., merchant contextual information, a consumer device identifier, etc.) from a merchant POS device 110. Once transaction-related information has been received, the transaction processing application 166 may identify a wide variety of transaction information and utilize at least a portion of the transaction information to provide any number of transaction-related services. For example, the transaction processing application 166 may identify information associated with products and/or services to be purchased, as well as payment account information (e.g., information extracted from one or more images, etc.) and/or other transaction-related information (e.g., coupon information, etc.). As desired, the transaction processing application 166 may invoke and/or request (e.g., request a service provider computer, etc.) the invocation of a wide variety of VAS associated with a transaction, such as the application of coupons, the award and/or redemption of loyalty rewards, etc. The transaction processing application 166 may then generate a proposed transaction request that is output for routing and/or delivery to a suitable transaction processor, such as a payment account issuer system 125. In the event that the transaction is authorized, the transaction processing application 166 may invoke and/or request the invocation of a wide variety of VAS following the transaction, such as receipt generation and/or delivery services, product registration services, etc. Indeed, a wide variety of suitable operations may be performed by the transaction processing application 166.

In certain embodiments, the transaction processing application 166 may be configured to receive an identifier (e.g., a serial number, a location identifier, etc.) that may be utilized to access or otherwise obtain merchant contextual information. As desired, the transaction processing application 166 may utilize the received identifier in order to obtain merchant contextual information, such as a merchant name, a merchant location, and/or information associated with a point of sale or point of service (e.g., a gas pump number, a table number, etc.). Alternatively, the transaction processing application 166 (or, in certain embodiments, the consumer device 105) may provide the identifier to another entity, such as a service provider computer 130 that provides cloud processing services. The service provider computer 130 may then utilize the identifier to access, look up, or otherwise obtain merchant contextual information to be utilized in the transaction.

One example of the operations that may be performed by a transaction processing application 166 and/or the merchant device 115 are described in greater detail below with reference to FIG. 2.

With continued reference to the merchant device 115, the one or more I/O interfaces 162 may facilitate communication between the merchant device 115 and one or more input/output devices; for example, one or more user interface devices, such as a display, a keypad, a mouse, a pointing device, a control panel, a touch screen display, a remote control, a microphone, a speaker, etc., that facilitate user interaction with the merchant device 115. The one or more network and/or communication interfaces 163 may facilitate connection of the merchant device 115 to one or more suitable networks and/or communication links. In this regard, the merchant device 115 may receive and/or communicate information to other components of the system 100, such as the consumer device 105, the issuer systems 125, the service provider computers 130, and/or other devices and/or systems.

With continued reference to FIG. 1, any number of issuer and/or financial institution systems 125 may be provided. An issuer system 125 may facilitate the backend processing of a proposed transaction. For example, an issuer system 125 may facilitate the approval and/or settlement of a proposed transaction. In certain embodiments, a proposed transaction may be routed to an issuer system 125 via a suitable transaction network (e.g., a debit network, a credit network, etc.), and the issuer system 125 may evaluate the proposed transaction. An approval or rejection of the proposed transaction may then be output for communication to a merchant device 115. The issuer system 125 may then facilitate the settlement of the proposed transaction. In certain embodiments, an issuer system 125 may include similar components as those discussed above for the merchant device 115. For example, an issuer system 125 may include any number of processors, memories, I/O interfaces, and/or network/communication interfaces.

Additionally, any number of service provider computers 130 may be utilized as desired in various embodiments of the disclosure. A service provider computer may provide a wide variety of transaction-related and/or value added services ("VAS") in association with transactions, such as coupon redemption services, loyalty services, location-based services, electronic receipt services, product registration services, warranty services, coupon issuance services, and/or the routing of a proposed transaction to an issuer for approval and/or settlement purposes. In certain embodiments, a service provider computer 130 may include similar components as those discussed above for the merchant device 115. For example, a service provider computer 130 may include any number of processors, memories, I/O interfaces, and/or network/communication interfaces.

A wide variety of suitable networks and/or communication channels 120 may be utilized in association with embodiments of the disclosure. Certain networks may facilitate communication between remote devices. For example, one or more telecommunication networks, cellular networks, wide area networks (e.g., the Internet) and/or transaction networks (e.g., branded networks (e.g., a VISA network, etc.), debit and/or PIN networks, and/or a wide variety of other suitable transaction networks) may facilitate communication between various components of the system 100. Other networks and/or channels 120 may facilitate communication between consumer devices 105 and merchant devices 115 (and/or merchant POS devices 110). These networks 120 may include wireless networks, RF networks, Bluetooth-enabled networks, NFC connections, etc. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Operational Overview

Figure 2:
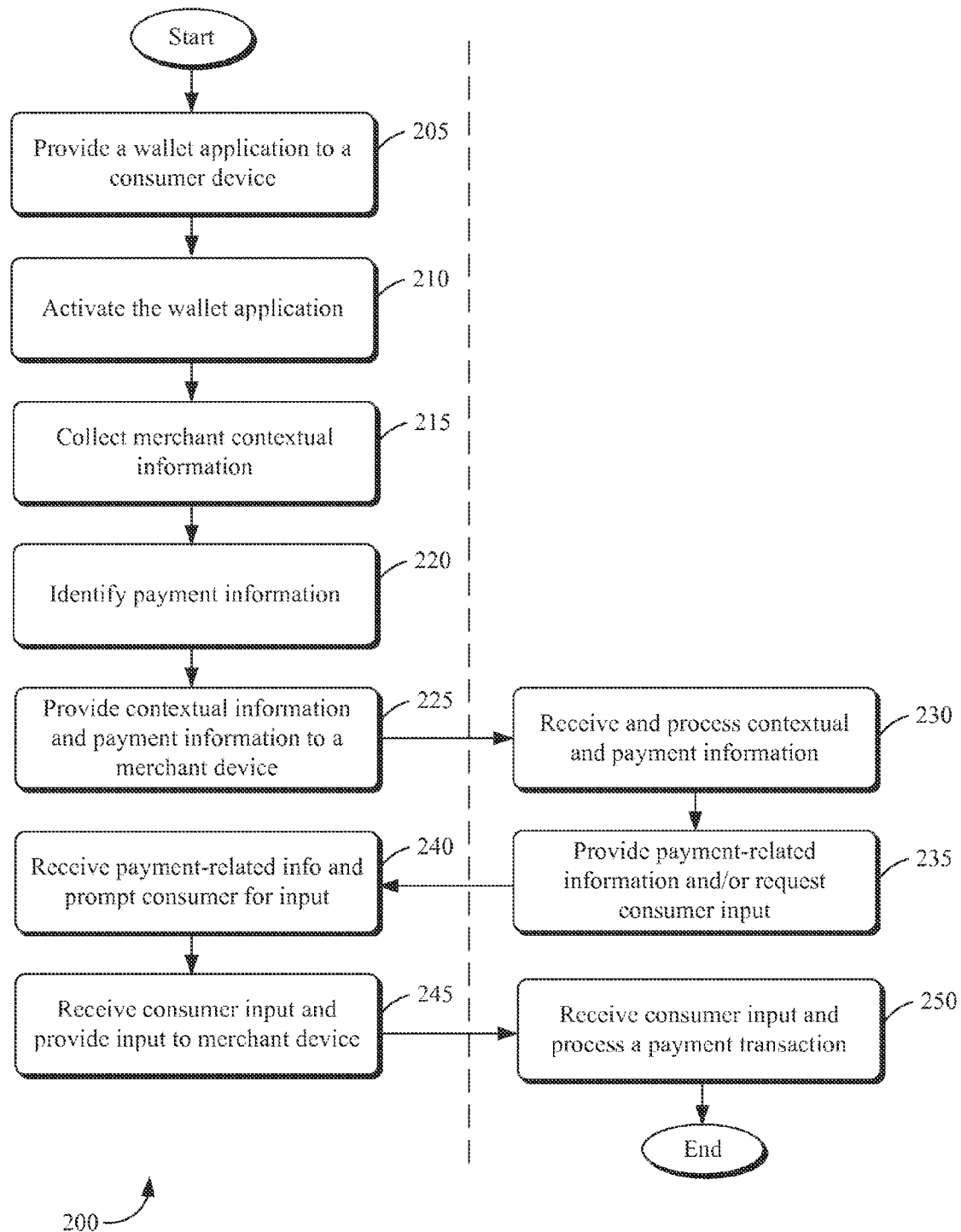
FIG. 2 illustrates a flow diagram of an example process for facilitating a point of sale transaction, according to an example embodiment of the disclosure.

FIG. 2 illustrates a flow diagram of an example method or process 200 for facilitating a point of sale transaction, according to an example embodiment of the disclosure. In certain embodiments, the operations of the method 200 may be performed by a suitable consumer device and merchant device, such as the consumer device 105 and the merchant device 115 illustrated in FIG. 1. The method 200 may begin at block 205.

At block 205, one or more wallet applications may be provided to a consumer device 105, such as the wallet application 157 illustrated in FIG. 1. A wide variety of suitable techniques may be utilized to provide a wallet application 157 to the consumer device 105. For example, the wallet application 157 may be provisioned (e.g., over the air provisioning, etc.) or downloaded to the consumer device 105. In certain embodiments, a wallet application 157 may be associated with a service provider or trusted service provider that facilitates the provision of wallet services. In other embodiments, a wallet application 157 may be associated with a particular merchant or payment account issuer.

Additionally, as desired, a wide variety of payment information may be stored on the consumer device 105. For example, payment account (e.g., track one and track two data) and/or other payment information may be stored on the consumer device 105. As desired, other transaction-related information may also be stored, such as coupon information and/or information associated with consumer preferences for a wide variety of VAS. In certain embodiments, information may be stored by one or more suitable secure elements associated with the consumer device 105. Alternatively, at least a portion of the information may be stored by other memory components associated with the consumer device 105. Additionally, as desired, a wide variety of suitable techniques may be utilized to provide the information to the consumer device 105 prior to storage. For example, payment information may be provisioned to the mobile device by any number of suitable service providers via a suitable over the air provisioning technique.

As mentioned above, a wide variety of different types of information may be stored by the consumer device 105. This information may include payment-related data and/or a wide variety of VAS data. Payment-related data may include, for example, identification information for a payment account to be utilized in association with a transaction (e.g., an account number, an identifier of an account issuer, etc.), consumer identification information that may be utilized to identify or select a payment account, and/or consumer device identification information (e.g., device identifier, a mobile telephone number, etc.) that may be utilized to identify or select a payment account. VAS data may include information associated with the provision of a wide variety of VAS in association with the transaction. These VAS may be implemented by the merchant device 115 and/or by any number of suitable service provider computers directly or indirectly in communication with the merchant device 115. A wide variety of different types of VAS may be implemented as desired in various embodiments of the disclosure, and each of the VAS may be associated with information received from the consumer device 105 and/or accessed from a suitable data source on behalf of the consumer. Examples of suitable pre-transaction VAS include, but are not limited to, electronic wallet services, loyalty services, coupon redemption services, location-based mobile services, electronic receipt services, product registration services, product warranty services, coupon and/or offer issuance services, targeted advertisement services, receipt reconciliation with issuer statement services, etc. Various VAS may be invoked prior to the completion of a transaction, during the completion of the transaction, and/or following the completion of the transaction.

An example electronic wallet service, which may alternatively be implemented as a transaction processing service, may facilitate the identification of a payment account to utilize in association with a transaction, as well as the verification of a consumer's identity. A loyalty service may identify an applicable loyalty account of the consumer, such as a loyalty account with the merchant. The loyalty service may then facilitate the issuance and/or redemption of loyalty points and/or loyalty rewards in association with the transaction. A coupon redemption service may compare products being purchased (e.g., UPCs, etc.) with available coupons (e.g., coupons identified from received transaction information, coupons stored at the service provider in association with the consumer, coupons accessed from an external data source, etc.), and the coupon redemption service may identify coupons that may be redeemed. The coupon redemption service may then facilitate the communication of applied coupons to coupon issuers, and the distribution of redeemed coupon revenue to the merchant. A location-based mobile service may perform a wide variety of suitable services based upon received location information (e.g., GPS coordinates, etc.) for a consumer device. For example, a location-based mobile service may evaluate a consumer device location based upon consumer transaction processing preferences, and the location-based service may determine whether the transaction may be completed based at least in part upon the evaluation. For example, a consumer may specify that a consumer device (e.g., a mobile device of a child) can only be used at gas stations and/or grocery stores in order to complete transactions. A location-based service may utilize GPS coordinates for the consumer device to identify a merchant for a proposed transaction, and the location-based service may determine whether a transaction can be approved for the merchant. As another example of a location-based service, a consumer may request different VA services in different states and/or geographical regions. Indeed, a wide variety of different location-based services may be provided as desired.

An example electronic receipt service may generate electronic receipts for a transaction, and the electronic receipts may be delivered to any number of recipients, such as the merchant POS device 105 and/or the consumer device 110. An example product registration service may automatic complete a product registration application on behalf of the consumer and deliver the registration application to a suitable recipient, such as a manufacturer. As desired, a consumer may specify the types of products (e.g., electronics, appliances, etc.) for which product registration services will be provided. An example product warranty service may identify and store product warranty information on behalf of the consumer. Another example product warranty service may evaluate consumer preferences in order to automatically (or upon prompting) purchase an extended warranty for a purchased product. An example coupon issuance service may identify, based upon, for example, the purchased products and/or historical purchases, one or more coupons to be issued to the consumer (e.g., coupons that may be printed on the back of or otherwise associated with a receipt). Similarly, a targeted advertisement service may identify advertisements and/or promotions to be communicated to the consumer. An example receipt reconciliation service may compare a purchase amount to a subsequently obtained issuer statement (e.g., a credit card statement, a bank statement, etc.) and identify any discrepancies. In other words, an example reconciliation service may conduct an audit of the transaction on behalf of the consumer and/or the merchant.

At block 210, a wallet application 157 may be activated on the consumer device 105. For example, a consumer may activate the wallet application 157 via a suitable interface associated with the consumer device 105. In certain embodiments, the wallet application 157 may be activated at a merchant location. For example, the wallet application 157 may be activated at a gas station, at a restaurant, or at a merchant store location.

At block 215, the wallet application 157 may collect a wide variety of merchant contextual information associated with a merchant POS device, such as one of the merchant POS devices 110 illustrated in FIG. 1. Examples of merchant contextual information include but are not limited to, a merchant location, a merchant name, and/or an identifier of a merchant POS device (e.g., an identifier of a gas pump, an identifier of a restaurant table, etc.). In certain embodiments, an identifier of merchant contextual information may be collected by the wallet application 157, and the identifier may be utilized by another entity to determine merchant contextual information. A wide variety of suitable methods and/or techniques may be utilized as desired to collect or capture merchant contextual information by the wallet application 157. A few example techniques are described in greater detail below with reference to FIGS. 3A-3D. For example, the wallet application 157 may direct the consumer device 105 to invoke one or more suitable reader devices (e.g., an NFC chip or reader, an RF chip or reader, a camera, etc.) to collect information from a static device (e.g., a static contactless device 170 such as an NFC tag or RF tag, etc.) or from one or more images (e.g., a barcode image, a QR code, etc.) situated at the merchant POS device 110. As another example, the wallet application 157 may direct the GPS application 158 to determine a position (e.g., GPS coordinates) of the consumer device 105. The wallet application 157 may then utilize the determined position to identify a merchant identifier and location, and the wallet application 157 may then prompt the user to enter identification information associated with the merchant POS device 110 (e.g., a gas pump number, a table number, etc.). As another example, the wallet application 157 may establish a local area network communication with a merchant system (e.g., a Wi-Fi connection) and a merchant location and/or identity may be received via the local area connection. The wallet application 157 may then prompt the user to enter identification information associated with the merchant POS device 110. Indeed, a wide variety of suitable techniques may be utilized to collect merchant contextual information, and the techniques described above are provided by way of example only.

In addition to collecting merchant contextual information, the wallet application 157 may collect and/or identify a wide variety of other transactional-related information. In certain embodiments, the wallet application 157 may facilitate the collection of information associated with one or more items to be purchases. For example, the wallet application 157 may direct one or more suitable reader devices to collect item information from contactless tags (e.g., NFC tags, RF tags, etc.) associated with items to be purchases (e.g., tags on items, tags on shelves, etc.). As another example, the wallet application 157 may direct one or more suitable reader devices to scan one or more barcodes or other images (e.g., QR codes, etc.) associated with items in order to collect item information. Alternatively, the wallet application 157 may facilitate the receipt of item information from any number of merchant checkout devices, such as merchant scanning devices. In this regard, the wallet application 157 may facilitate the collection of item-related information and allow a "checkout in the aisle" option or a checkout option in which the items are not required to be scanned at a merchant register or payment terminal.

At block 220, the wallet application 157 may facilitate the identification of a wide variety of payment information or payment data to be utilized in association with a transaction. According to an aspect of the disclosure, the payment information may include information associated with a payment account to be utilized in association with a payment transaction, such as a payment account number. In one example embodiment, the payment information may include track one and track two data, such as the data that may be stored by a conventional magnetic stripe payment device. Additionally, in certain embodiments, the payment information may include a wide variety of other transaction-related information, such as consumer identification information, consumer device identification information, coupons and/or offers to be redeemed, loyalty information (e.g., a loyalty account number, if available), electronic receipt preferences, warranty preferences, product registration preferences, etc.

At block 225, the wallet application 157 may provide the collected merchant contextual information, payment information (e.g., a payment account number, etc.), and/or other transaction-related information to a suitable merchant device 115 for processing. As desired, the wallet application 157 may additionally communicate a request for a payment transaction. A wide variety of suitable communications sessions and/or networks may facilitate communication between the consumer device 105 and the merchant device 115. As a result of the wallet application 157 collecting merchant contextual and payment information, the wallet application 157 and the associated consumer device 105 may function as a virtual reader device that collects transaction-related information. For example, even if a suitable merchant reader device (e.g., an NFC reader, an RF reader, etc.) is not located at or associated with a merchant POS device, a transaction may still be facilitated at the point of sale or point of service.

At block 230, the merchant device 115 may receive the merchant contextual information and the payment information. The merchant device 115 may then process the received information in association with a payment transaction. As desired, the merchant device 115 may provide information associated with the payment transaction (e.g., a transaction amount, etc.) and/or one or more requests for consumer input to the consumer device at block 235. For example, a request for a desired tip amount may be communicated during a restaurant transaction. The consumer device 105 may receive the payment-related information and/or requests at block 240 and, in the event that a request is received, the wallet application 157 may prompt the consumer for consumer input. For example, the consumer may be prompted to enter a desired tip amount. As another example, the consumer may be prompted to approve a transaction.

At block 245, consumer input may be received by the consumer device 105, and the wallet application 157 may process the received consumer input. The wallet application 157 may then direct communication of the received user input to the merchant device 115. At block 250, the merchant device 115 may receive any consumer input, and the merchant device 115 may process a transaction (e.g., a payment transaction, etc.) utilizing the merchant contextual information, payment information, consumer input and/or VAS information. For example, the merchant device 115 may activate a merchant POS device, such as a gas pump, to allow the consumer to utilize the merchant POS device. As another example, the merchant device 115 may generate a proposed payment transaction, and the merchant device 115 may communicate the proposed payment transaction to an issuer system or payment processing system via any number of suitable transaction networks. Additionally, as desired, the merchant device 115 may request the provision of a wide variety of suitable VAS. For example, the merchant device 115 may communicate any number of VAS requests to one or more suitable service provider systems.

In certain embodiments, the merchant device 115 may be configured to receive an identifier (e.g., a serial number, a location identifier, etc.) of merchant contextual information from the wallet application 157. The identifier may be utilized to access or otherwise obtain merchant contextual information. As desired, the merchant device 115 may utilize the received identifier to obtain merchant contextual information, such as a merchant name, a merchant location, and/or information associated with a point of sale or point of service (e.g., a gas pump number, a table number, etc.). For example, the merchant device 115 may utilize the identifier to access one or more data stores of merchant contextual information. Alternatively, the merchant device 115 (or, in certain embodiments, the consumer device 105) may provide the identifier to another entity, such as a service provider computer 130 that provides cloud processing services. The service provider computer 130 may then utilize the identifier to access, look up, or otherwise obtain merchant contextual information to be utilized in association with the transaction.

As a result of utilizing identifiers of merchant contextual information, it may be easier to associate various tags (e.g., NFC tags, RF tags, etc.), images, and/or other components with merchant devices (e.g., gas pumps, restaurant tables, etc.). The association of an identifier with the merchant contextual information can be made at a server level and/or at a centralized storage location. Accordingly, in the event that a tag is replaced, an update may be made to the stored information rather than specifically configuring a tag or other component for a particular merchant device.

The method 200 may end following block 250.

FIG. 3 illustrates a flow diagram of another example process 300 for communicating payment information from a consumer device to a merchant terminal, according to an example embodiment of the disclosure. In certain embodiments, the operations of the method 300 may be performed by a suitable consumer device and merchant POS device, such as the consumer device 110 and the merchant POS device 105 illustrated in FIG. 1. The method 300 may begin at block 305.

FIGS. 3A-3D illustrate flow diagrams of example methods or processes 300, 315, 340, 360 for collecting information associated with a transaction, according to an example embodiment of the disclosure. The illustrated methods 300, 315, 340, 360 are example methods for facilitating the collection of merchant contextual information. Certain of the methods may be performed by a suitable consumer device and/or associated wallet application, such as the consumer device 105 and wallet application 157 illustrated in FIG. 1. Other methods may be performed by a suitable merchant POS device, such as a gas pump.

Figure 3A:
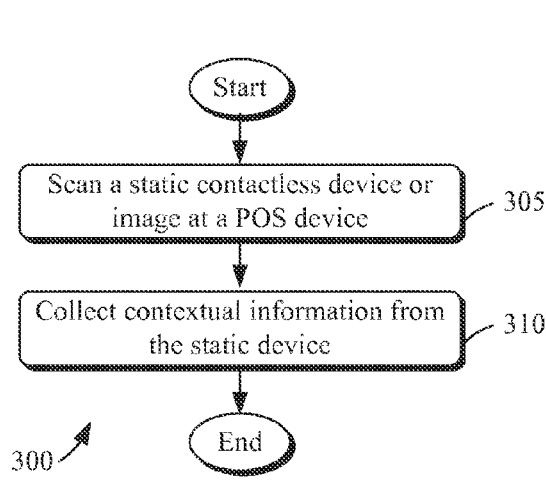
FIGS. 3A-3D illustrate flow diagrams of example processes for collecting information associated with a transaction, according to an example embodiment of the disclosure.

Turning to FIG. 3A, a first example process 300 or method for collecting merchant contextual information by a consumer device 105 is illustrated. The method 300 may begin at block 305. At block 305, one or more suitable reader devices may be utilized to scan and/or interrogate one or more contactless devices and/or images at a POS device. Contextual information may then be collected from the static device and/or images at block 310.

As one example, a static NFC or RF tag may be read in order to collect merchant contextual information. As desired, the static tag may be woken up or invoked by the wallet application 157 in order to read the merchant contextual information. As another example, one or more barcode and/or QR code images may be captured by the consumer device 105. The wallet application 157 may then process the captured images in order to extract merchant contextual information.

The method 300 may end following block 310.

Figure 3C:
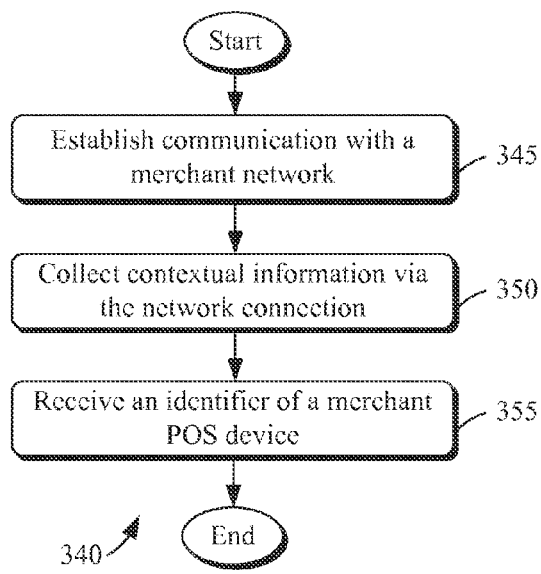
Figure 3B:
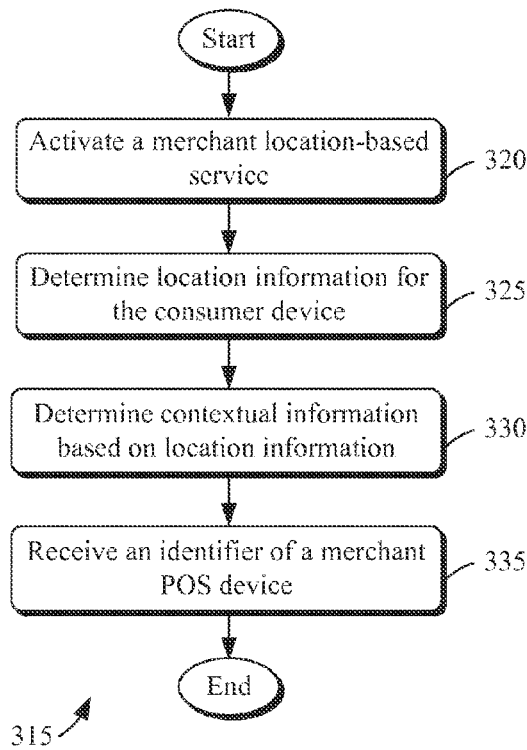

FIG. 3B illustrates a second example process 315 or method for collecting merchant contextual information (or an identifier of merchant contextual information) by a consumer device 105. The method 315 may begin at block 320. At block 320, a merchant location-based service may be activated on a consumer device 105. For example, a location-based application (e.g., a GPS application) may be activated on the consumer device 105. In certain embodiments, the location-based application may be activated by a wallet application 157. In other embodiments, the location-based application may be a suitable application associated with a merchant.

At block 325, location information for the consumer device 105 may be determined. For example, GPS coordinates may be determined for the consumer device 105. At block 330, merchant contextual information may be determined based at least in part upon the location information. For example, the GPS coordinates may be processed in order to identify or determine a merchant location at which the consumer device 105 is located. In one example embodiment, GPS coordinates may be translated into a merchant identifier and store identifier.

At block 335, a consumer or user of the consumer device 105 may be prompted to enter information associated with a merchant POS device. For example, the consumer may be prompted to enter a gasoline pump number or a restaurant table number. The consumer may utilize one or more suitable interfaces to enter the requested information. In this regard, merchant contextual information may be collected.

The method 315 may end following block 335.

FIG. 3C illustrates a third example process 340 or method for collecting merchant contextual information by a consumer device 105. The method 340 may begin at block 345. At block 345, communication may be established between the consumer device 105 and a merchant network, such as a merchant Wi-Fi network, a merchant Bluetooth network, or another suitable network. For example, a merchant may provide a Wi-Fi hot spot at a gas station. A suitable application associated with the consumer device 105, such as a wallet application 157, may be utilized to connect to the Wi-Fi hot spot.

At block 350, merchant contextual information, such as a merchant identifier and store identifier, may be collected by the consumer device 105 via the established network connection. Additionally, at block 355, a consumer or user of the consumer device 105 may be prompted to enter information associated with a merchant POS device. For example, the consumer may be prompted to enter a gasoline pump number or a restaurant table number. The consumer may utilize one or more suitable interfaces to enter the requested information. In this regard, merchant contextual information may be collected.

The method 340 may end following block 355.

Figure 3D:
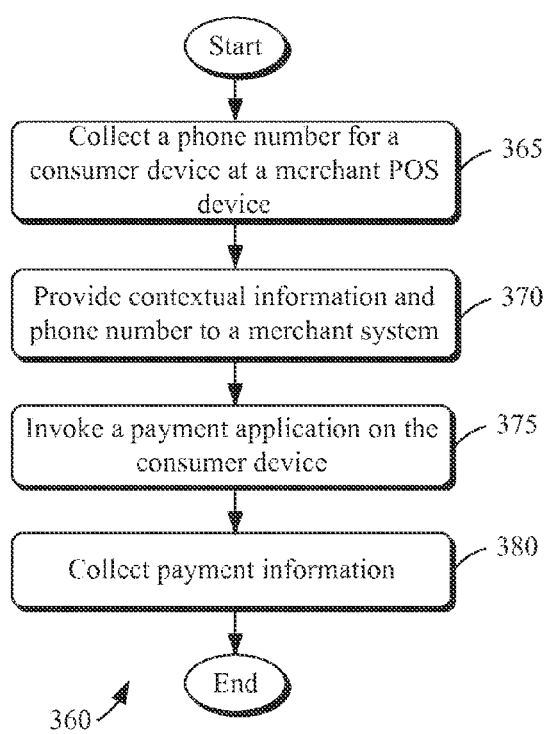

FIG. 3D illustrates an example process 360 or method for collecting merchant contextual information by a merchant POS device, such as a gas pump. The method 360 may begin at block 365. At block 365, a merchant POS device, such as a gas pump or restaurant device associated with a particular table, may prompt a consumer to enter an identifier of a consumer device 105, such as a mobile telephone number associated with a mobile device. The consumer may then enter the device identifier into the merchant POS device.

At block 370, the merchant POS device may provide merchant contextual information and the device identifier (e.g., telephone number, etc.) to a merchant system for processing, such as the merchant system 115 illustrated in FIG. 1. At block 375, the merchant system 115 may utilize the device identifier to contact the consumer device 105, and the merchant system 115 may invoke a suitable payment application stored on the consumer device 105. In this regard, the merchant system 115 may collect payment information from the consumer device 105 at block 380, and the merchant system 115 may complete a payment transaction.

The method 360 may end following block 380.

Figure 4:
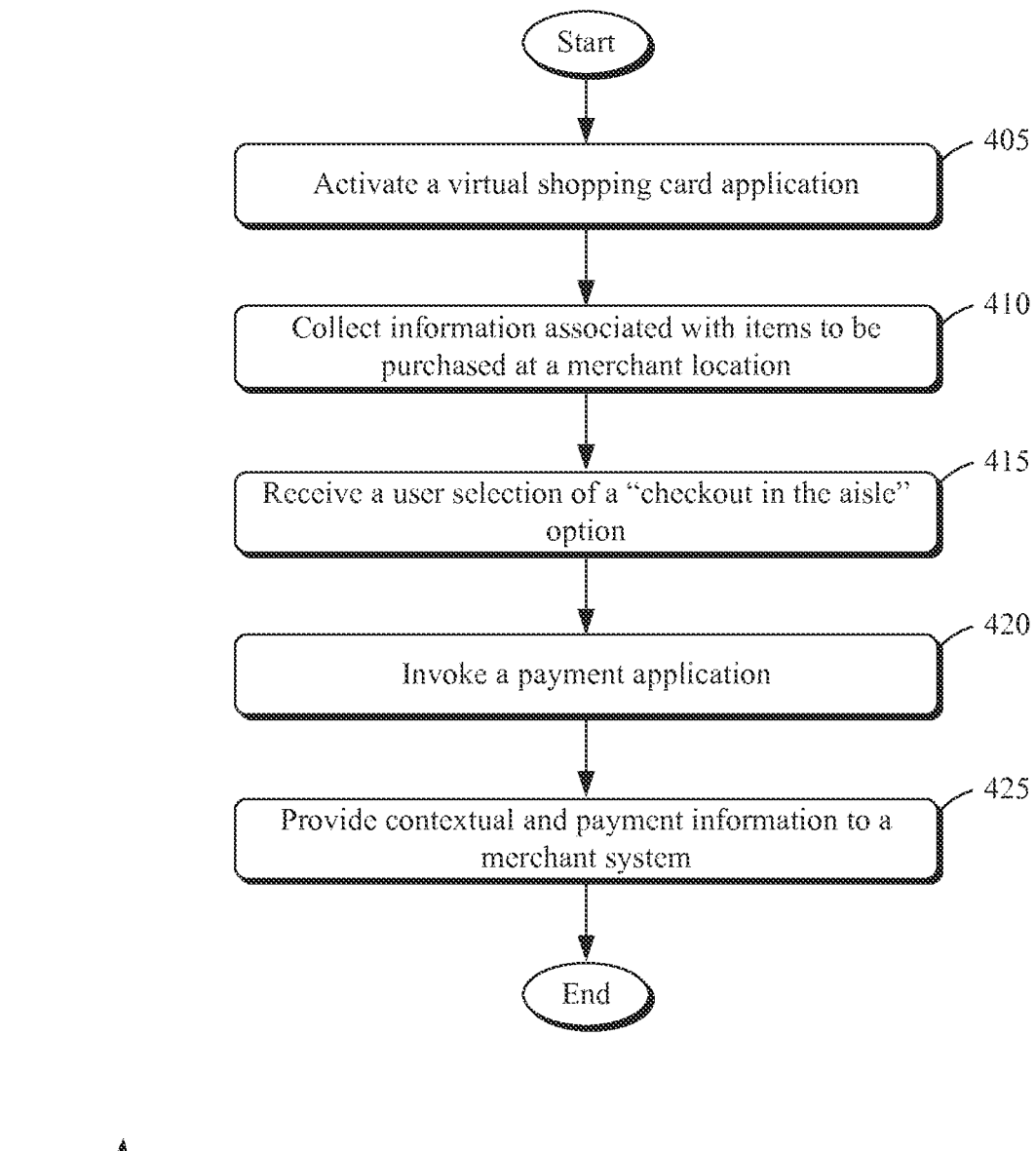
FIG. 4 illustrates a flow diagram of an example process for completing a checkout function at a merchant location, according to an illustrative embodiment of the disclosure.

FIG. 4 illustrates a flow diagram of an example process or method 400 for completing a checkout function at a merchant location, according to an illustrative embodiment of the disclosure. In certain embodiments, the operations of the method 400 may be performed by a suitable consumer device, such as the consumer device 105 illustrated in FIG. 1. The method 400 may begin at block 405.

At block 405, a virtual shopping cart application may be activated on the consumer device 105. In certain embodiments, the virtual shopping cart application may be a component of or may be associated with a suitable wallet application, such as the wallet application 157 illustrated in FIG. 1. At block 410, the shopping cart application may be utilized to collect information associated with one or more items to be purchased at a merchant location. For example, the shopping cart application may direct the collection of item information (e.g., item identifiers, price information, location identifiers that may be utilized to look up item information, etc.) from one or more contactless tags (e.g., NFC tags, RF tags, etc.) associated with items, such as tags attached to items and/or tags located on shelves within a merchant location. As another example, the shopping cart application may direct the scanning of one or more images, such as barcode images and/or QR codes, associated with items to be purchased. The shopping cart application may then process the images in order to extract item information.

At block 415, the shopping cart application may receive a user selection for a "checkout in the aisle" option or transaction. For example, a user may select a "checkout in the aisle" from one or more suitable user interfaces generated by the shopping card application. At block 420, a suitable payment application, such as a payment application stored on a secure element of the consumer device 105, may be invoked by the shopping cart application. In this regard, payment information (e.g., a payment account number, etc.) may be collected by the shopping cart information. At block 425, the shopping cart application may provide merchant contextual information, item information, and payment information to a suitable merchant system, such as the merchant system 115 illustrated in FIG. 1, in order to facilitate a payment transaction for the items. In this regard, the shopping cart application and/or a suitable wallet application may facilitate transactions without the consumer waiting in line to have items scanned at a merchant register or payment terminal.

The method 400 may end following block 425.

The operations described and shown in the methods 200, 300, 315, 340, 360, 400 of FIGS. 2-4 may be carried out or performed in any suitable order as desired in various embodiments of the disclosure. Additionally, in certain embodiments, at least a portion of the operations may be carried out in parallel. Furthermore, in certain embodiments, less than or more than the operations described in FIGS. 2-4 may be performed.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed disclosure is:

1. One or more non-transitory computer-readable media configured to store computer-executable instructions that, when executed by one or more processors, configure the one or more processors to:

store, in at least one secure element component of a mobile device, user payment information including one or more payment account numbers;

proposing a contactless payment transaction between a user of the mobile device and a merchant, via a wallet application on the mobile device, before the mobile device is at a merchant location of the merchant associated with the proposed contactless payment transaction;

receive instructions, at the wallet application, to initiate the wallet application on the mobile device while the user of the mobile device is at the merchant location;

determine, utilizing the wallet application, merchant identification information for the proposed contactless payment transaction based at least in part on comparing a position of the mobile device using global positioning system (GPS) coordinates received from a GPS application of the mobile device with a determined merchant location of the merchant wherein the determined merchant identification information comprises a merchant identifier;

determine, based at least in part on the determined merchant identification information, merchant contextual information including an identifier of a merchant device at the merchant location;

in response to determining the merchant identification information, determine, by utilizing the wallet application to access the at least one secure element component a payment account number from the one or more payment account numbers on the at least one secure element component to be used in association with the proposed contactless payment transaction;

identify, utilizing the wallet application, user loyalty account information of the user associated with the merchant and stored in association with the payment account number in the at least one secure element component;

receive, utilizing the wallet application, user input for identification of a merchant payment station at the merchant location, wherein the merchant payment station is not configured to accept the proposed contactless payment transaction; and upon determining that the merchant payment station is not configured to accept the proposed contactless payment transaction, provide, utilizing the wallet application, the determined merchant contextual information, the payment account number from the at least one secure element component, and the identified user loyalty account information to the merchant device to complete a point of sale transaction for the proposed contactless payment transaction via wireless communication and to facilitate a redemption of loyalty points in association with the proposed contactless payment transaction.

2. The one or more non-transitory computer-readable media of claim 1, wherein the merchant payment station comprises one of (i) a gas pump or (ii) a restaurant table location.

3. The one or more non-transitory computer-readable media of claim 1, wherein the determined merchant identification information is collected by reading data from one or more contactless tags associated with the merchant payment station.

4. The one or more non-transitory computer-readable media of claim 1, wherein the determined merchant identification information is collected by scanning at least one of (i) a barcode image or (ii) a quick response code image associated with the merchant payment station.

5. The one or more non-transitory computer-readable media of claim 1, wherein the computer-executable instructions further configure the one or more processors to:
activate a location-based application on the mobile device;
determine, utilizing the location-based application, the GPS coordinates associated with the mobile device;
identify the merchant located at or near the GPS coordinates; and
provide to the wallet application the merchant identifier and a merchant location identifier associated with the merchant.

6. The one or more non-transitory computer-readable media of claim 1, wherein the computer-executable instructions further configure the one or more processors to:
establish communication with a merchant location network; and
identify at least a portion of the merchant identification information via the established communication.

7. A computer-implemented method comprising:
storing, in at least one secure element component of a mobile device, user payment information including one or more payment account numbers;
proposing a contactless payment transaction between a user of the mobile device and a merchant, via a wallet application on the mobile device, before the mobile device is at a merchant location of the merchant associated with the proposed transaction;
receiving instructions, at the wallet application, to initiate the wallet application on the mobile device while the user of the mobile device is at the merchant location;
determining, utilizing the wallet application, merchant identification information for the proposed contactless payment transaction based at least in part on comparing a position of the mobile device using global positioning system (GPS) coordinates received from a GPS application of the mobile device with a determined merchant location of the merchant, wherein the determined merchant identification information comprises a merchant identifier;
determining, based at least in part on the determined merchant identification information, merchant contextual information including an identifier of a merchant device at the merchant location;
in response to determining the merchant identification information, determining, utilizing the wallet application to access the at least one secure element component, a payment account number from the one or more payment account numbers on the at least one secure element component to be used in association with the proposed contactless payment transaction;
identifying, utilizing the wallet application, user loyalty account information of the user associated with the merchant and stored in association with the payment account number in the at least one secure element component;
receiving, utilizing the wallet application, user input for identification of a merchant payment station at the merchant location, wherein the merchant payment station is not configured to accept the proposed contactless payment transaction; and
upon determining that the merchant payment station is not configured to accept the proposed contactless payment transaction, providing, utilizing the wallet application, the determined merchant contextual information, the payment account number from the at least one secure element component, and the identified user loyalty account information to the merchant device via wireless communication to complete a point of sale transaction for the proposed contactless payment transaction and to facilitate a redemption of loyalty points in association with the proposed contactless payment transaction.

8. The computer-implemented method of claim 7, wherein the merchant payment station comprises one of (i) a gas pump or (ii) a restaurant table location.

9. The computer-implemented method of claim 7, wherein the determined merchant identification information is collected by reading data from one or more contactless tags associated with the merchant payment station.

10. The computer-implemented method of claim 7, wherein the determined merchant identification information is collected by scanning at least one of (i) a barcode image or (ii) a quick response code image associated with the merchant payment station.

11. The computer-implemented method of claim 7, further comprising:
activating a location-based application on the mobile device;
determining, using the location-based application, the GPS coordinates associated with the mobile device;
identifying the merchant located at or near the GPS coordinates; and
providing to the wallet application the merchant identifier and a merchant location identifier associated with the merchant.

12. The computer-implemented method of claim 7, further comprising:
establishing communication with a merchant location network; and
identifying at least a portion of the determined merchant identification information via the established communication.

* * * * *